Nov. 23, 1965

A. L. STUCHBERY ETAL 3,219,992

MONITORING APPARATUS

Filed July 20, 1959

3 Sheets-Sheet 1

Fig. 1.

Inventors
Arthur Leslie Stuchbery
John Alfred Drake
By
Mason, Porter, Diller & Stewart
Attorneys

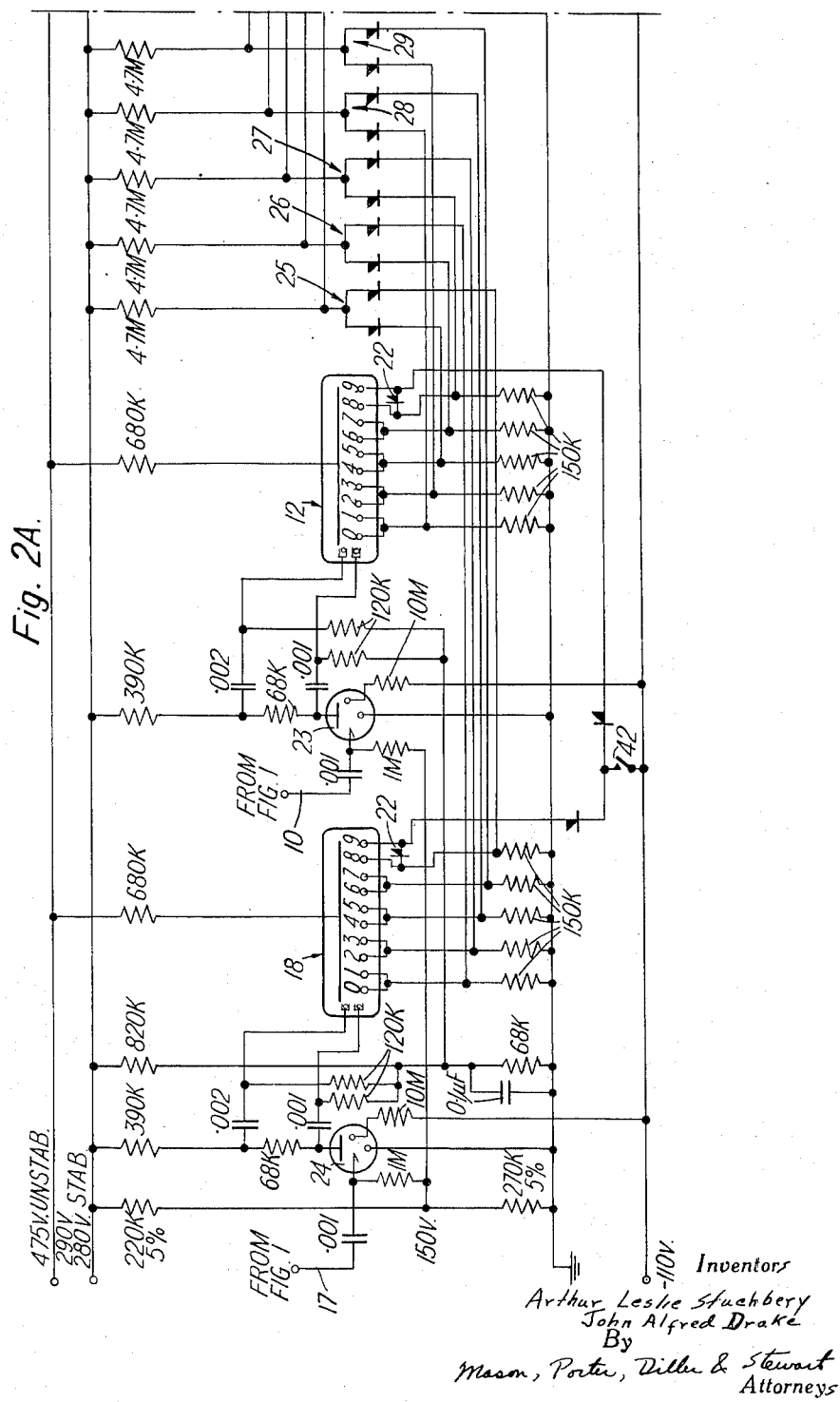

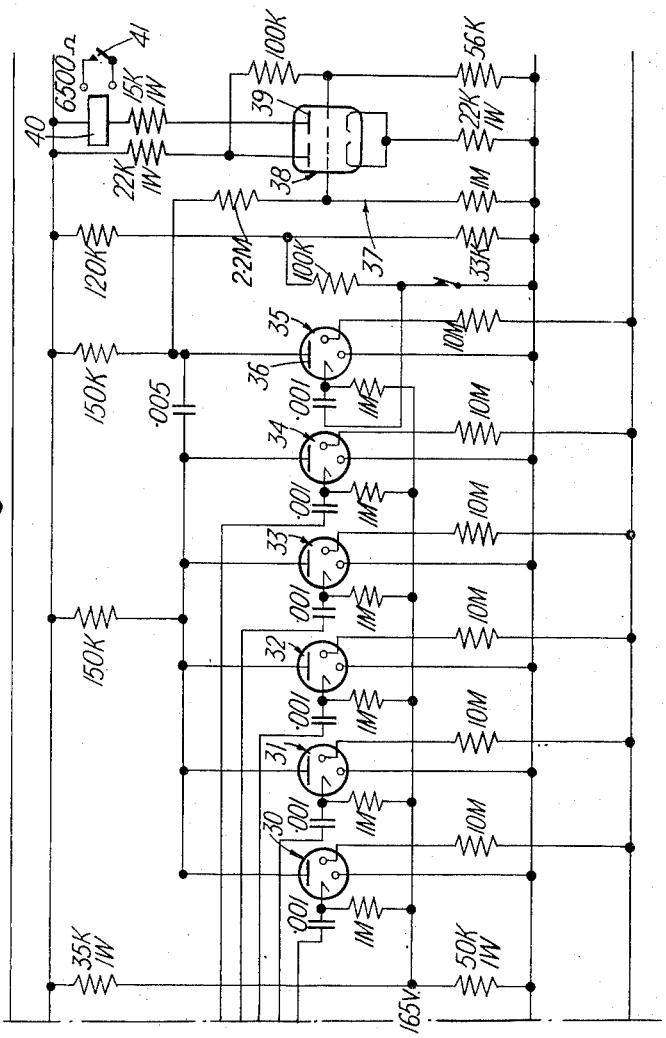

United States Patent Office 3,219,992
Patented Nov. 23, 1965

3,219,992
MONITORING APPARATUS
Arthur Leslie Stuchbery, Enfield, England, and John Alfred Drake, N. Adelaide, South Australia, Australia, assignors, by mesne assignments, to Continental Can Company, Inc., New York, N.Y., a corporation of New York
Filed July 20, 1959, Ser. No. 828,294
3 Claims. (Cl. 340—259)

This invention relates to apparatus for monitoring the passage of articles through a machine.

As is well understood, some forms of machine are now being adapted to operate at ever increasing rates of output and whereas at the previous lower rates of output it was not unreasonable to expect an operator visually to monitor the operation of the machine, at the higher output rates now prevailing the strain of human monitoring is too great. Further, at the said higher rates of output, should a holdup or jam occur in the machine the danger of damage to the machine, and to articles passing through the machine, is greatly increased. It is a main object of the present invention to provide a new or improved form of apparatus for automatically monitoring the passage of articles through a machine.

According to the present invention there is provided apparatus for monitoring the passage of articles through a machine, comprising a first and a second detector device both arranged for actuation by the passage of articles through the machine and spaced from each other by a distance such that a predetermined number of articles are located therebetween during continuity of article feeding, a first and a second electronic counter respectively connected to said first and second detector devices for actuation thereby when articles are detected by the detector devices, said counters each having the same radix and being so arranged that a predetermined relation is maintained between the counts thereof during continuity of article feeding, and comparing means connected to the counters and operable to produce an output signal when the relation between the counts is other than said predetermined relation thereby to give an indication that the number of articles between the detector devices is different from said predetermined number.

In order that the invention may be clearly understood one embodiment thereof will now be described, by way of example, with reference to the accompanying drawings, in which:

FIGURE 1 is a circuit diagram illustrative of detector devices embodied in monitoring apparatus according to the invention, and FIGURES 2A and 2B together are a circuit diagram of apparatus controlled by the detector devices.

The monitoring apparatus about to be described will be assumed, for the purposes of description, to be applied to a machine for lacquering metal sheets, but it is to be understood that apparatus constructed in accordance with the invention can be employed for other purposes, as for example for monitoring the passage of metal sheets through a printing machine, or the passage of can bodies through a can body forming machine.

Referring to the drawings, there is illustrated therein monitoring apparatus adapted to monitor the passage of metal sheets as they issue from a lacquering machine and the monitoring apparatus incorporates two detector circuits of substantially similar construction both of which are, for convenience, illustrated by FIGURE 1. Each detector circuit includes a detector coil 1 and the coils 1 are disposed one in advance of the other each to be adjacent the path of the sheets issuing from the machine, and, as described below, the second detector coil is so spaced from the first that a predetermined number of sheets are located between the two coils when there is continuity of sheet feeding. Each detector coil is arranged to shunt the coil 2 of a valve oscillator, the arrangement being such that the passage of a sheet over the detector coil modifies the effective inductance of the detector coil due to eddy currents which are induced in the sheet. The change of inductance in the detector coil effects modification of the oscillator frequency and this change of frequency is converted into a D.C. voltage change by means of a phase-discriminating circuit. The phase-discriminating circuit consists of a transformer 3 connected to the oscillator and to a valve 4, the outputs from the transformer 3 and valve 4 being connected respectively to the control grid and the suppressor grid of a pentode 5. The phase relationship between these two signals produces a D.C. voltage output from the anode of the pentode 5. This D.C. voltage passes via line 6 to a cathode follower 7 and thence via line 8 to a switch which in FIGURE 1 is shown as a Schmitt trigger circuit 9. In the detector circuit associated with the detector coil 1, over which the sheets first pass, the output via line 10 is made from anode 11 of the Schmitt trigger circuit. Line 10, as can be seen from FIGURE 2A, is connected to a first signal transmitter 12 referred to below.

In the detector circuit associated with the detector coil 1 for the second detector circuit, the output from the Schmitt trigger circuit 9 is taken from the anode 13 thereof through a relay 14. Closing of the contact 15 of the relay 14 produces an output from a potential divider 16 along a line 17 to a second signal transmitter 18, FIGURE 2A. The relay 14, through a further contact 19 thereof, FIGURE 1, controls a 110 volt A.C. supply via lines 20, 21 to a mechanical batch counter, not shown.

Each of the signal transmitters consists of an electronic counter, the counters illustrated in FIGURE 2A being of the kind known as dekatrons. This form of counter is capable of recording up to ten impulses, but to economise equipment the cathode of the counters have been paired as shown in FIGURE 2A, the cathode of highest value, that is the numbers 8 and 9 cathodes, of each counter being paired through rectifiers 22 which ensure that on resetting of the counters the cathode of highest value, that is the No. 9 cathodes, of each counter is conducting. The input of impulses from the detector circuits to the signal transmitters 12, 18 is effected through valves 23, 24 respectively and the outputs from the cathodes of the transmitters are connected, according to predetermined significance, through coincidence gates 25, 26, 27, 28, and 29 with trigger tubes 30, 31, 32, 33, and 34, FIGURE 2B, respectively. The outputs from the trigger tubes are taken in common to a further trigger tube 35, the anode 36 of which is connected through a potential divider 37 with a switch 38, shown in FIGURE 2B as a Schmitt trigger circuit, the anode 39 of which is connected with a relay 40 adapted to control operation of any suitable form of alarm signal device 41, such as a bell or a visual alarm device, or a solenoid or other device adapted to cause operation of the machine to cease. In the event of a power failure the current through switch 38 will cease and the contacts of the relay 40 will remain open or, if closed, will be caused to open.

The arrangement of the gates 25 to 29 is such that only when any one gate receives a signal from each of the counters 12, 18 will the appropriate trigger tube 30 to 34 be ignited. Ignition of any tube 30 to 34 extinguishes tube 35 and the action of the anode voltage rising on tube 35 switches the current flowing through the anode 39 of switch 38 and so releases the relay 40 to initiate operation of the alarm signal device. Accordingly, it will be understood that the gates 25 to 29 comprise a comparing device which receives signals from the transmitters 12, 18 and any one gate of the comparing device is operable to effect operation of the alarm signal device only when that gate receives a signal of predetermined significance from each of the transmitters 12, 18.

Preparatory to operation of the machine, a pushbutton reset switch 42, FIGURE 2A, is operated to reset each of the signal transmitters 12, 18, and the operation of the reset switch causes each of the No. 9 cathodes of the transmitters to be conducting. Thus, during the passage of the first four sheets over the detector coil 1 for the first detector device, the cathodes Nos. 1, 2, 3 of transmitter 12 become successively conducting. If the machine is functioning correctly when the passage of the fifth sheet is recorded by the No. 4 cathode of the first transmitter 12, the passage of the first sheet is recorded by the No. 0 cathode of the second transmitter 18 becoming conducting. If, however, the first sheet is not passed to the detector device controlling the transmitter 18, the No. 9 cathode of the second transmitter 18 will remain conducting and signals will be passed to gate 25 from the No. 4 cathode of the transmitter 12 and from the No. 9 cathode of the second transmitter 18, thus causing an output to trigger tube 30 thereby to operate trigger tube 35 to initiate an alarm signal as described above.

If, however, the first sheet should be properly fed past the detector device controlling the second transmitter 18, and the second sheet be not fed past the detector device controlling the second transmitter when the sixth sheet is recorded by the No. 5 cathode of the first transmitter 12, this will be a condition requiring an alarm signal to be initiated. However, due to the pairing of the cathodes of the transmitters this error is not caused to initiate the alarm signal until the seventh sheet is recorded by the No. 6 cathode of the first transmitter 12 when, because the No. 0 cathode of the second transmitter 18 is conducting, there will be a signal from the No. 0 cathode of the second transmitter to gate 26 which will also receive a signal from the No. 6 cathode of the first transmitter 12. Accordingly, an output from gate 26 will be passed to trigger tube 31 and thence to trigger tube 35 to initiate an alarm signal.

In the foregoing description there has been described the application of the invention to the delivery of sheets from a machine in a particular manner, but it will be understood that, if desired, the apparatus may be modified to monitor the progress of the sheets through the machine to the delivery end thereof. It will be understood that during their passage through the machine the sheets pass through a number of positions at each of which an operation is performed thereon, and at each such position there is provided a detector coil 1 controlling a detector circuit similar to that described above and which, in turn, controls a signal transmitter which, in these circumstances, may be a binary or a ternary counter. The counter operated under control of the detector coil for one position will operate in conjunction with the counter for the next succeeding operational position so that, if a sheet is not presented to one of said operational positions, an alarm signal is initiated to give an indication of the error condition or to effect stopping of the machine.

It will also be understood that when the articles being passed through the machine are sheets for lacquering or printing, it is desirable that the sheets be fed squarely through the machine and to ensure that this manner of feeding is maintained a monitoring apparatus according to the invention may be provided, the apparatus being modified to embody two binary counters each controlled by a detector coil in the manner herein described, but in this embodiment of the invention, the two detector coils are arranged in a line at right-angles to the direction of movement of the sheet through the machine. Accordingly, if the sheet should be fed to the machine askew, so that the leading edge, or the detecting area of the sheet does not simultaneously pass over the two detector coils, the binary counters controlled by the detector coils will, through a comparing device connected thereto, cause an alarm signal to be initiated.

In the foregoing the monitoring apparatus has been described as being wholly electronic but it will be understood that, if desired, the apparatus may incorporate photoelectric or other suitable sensing means, the switches described may be other than Schmitt trigger circuits, and the signal transmitters and comparing devices may be mechanical.

We claim:

1. Apparatus for monitoring the passage of articles through a machine, comprising a first and second detector device both arranged for actuation by the passage of articles through the machine and spaced from each other by a distance such that a predetermined number of articles are located therebetween during continuity of article feeding, a first and a second electronic counter respectively connected to said first and second detector devices for actuation thereby when articles are detected by the detector devices, said counters each having the same radix and being so arranged that a predetermined relation is maintained between the counts thereof during continuity of article feeding, and comparing means connected to the counters and operable to produce an output signal when the relation between the counts is other than said predetermined relation thereby to give an indication that the number of articles between the detector devices is different from said predetermined number, an alarm signal device operable by the output from said comparing means, the comparing device including coincidence gates the outputs of which are connected one each to a trigger tube, the outputs from said tubes being connected in common to a switch adapted to effect operation of the alarm signal device, and each pair of inputs of each said gate being connected to a predetermined pair of outputs from said counters, each counter being a dekatron counter the cathodes of which are paired for connection in common to the gate appropriate thereto, the two cathodes of highest value of each counter being paired through a rectifier to ensure that in each counter on resetting of the counter the cathode of highest value is conducting.

2. Apparatus for monitoring the passage of articles through a machine, comprising a first and second detector device both arranged for actuation by the passage of articles through the machine and spaced from each other by a distance such that a predetermined number of articles are located therebetween during continuity of article feeding, a first and a second electronic counter respectively connected to said first and second detector devices for actuation thereby when articles are detected by the detector devices, said counters each having the same radix and being so arranged that a predetermined relation is maintained between the counts thereof during continuity of article feeding, and comparing means connected to the counters and operable to produce an output signal when the relation between the counts is other than said predetermined relation thereby to give an indication that the number of articles between the detector devices is different from said predetermined number, an alarm signal device operable by the output from said comparing means, the comparing device including coincidence gates the outputs of which are connected one each to a trigger tube, the outputs from said tubes being connected in common to a switch adapted to effect operation of the alarm signal device, and each pair of inputs of each said gate being connected to a predetermined pair of outputs from said counters, each detector device including a trigger circuit the output from which is applied to the counter appropriate to the detector device, a pentode the output from which is applied to the trigger circuit, a transformer the output from the secondary of which is applied to the control grid of the pentode, a valve connected between the transformer primary and the suppressor grid of the pentode, and a valve oscillator connected to the transformer primary and to a detector coil the effective inductance of which is modified by the passage of a metal article past the coil so as to vary the frequency of oscillation of the oscillator.

3. Apparatus according to claim 1, wherein each detector device includes a trigger circuit the output from which is applied to the counter appropriate to the detector device, a pentode the output from which is applied to the trigger circuit, a transformer the output from the secondary of which is applied to the control grid of the pentode, a valve connected between the transformer primary and the suppressor grid of the pentode, and a valve oscillator connected to the transformer primary and to a detector coil the effective inductance of which is modified by the passage of a metal article past the coil so as to vary the frequency of oscillation of the oscillator.

References Cited by the Examiner

UNITED STATES PATENTS

| 2,158,069 | 5/1939 | Grover | 250—223 X |
| 2,171,362 | 8/1939 | Gulliksen | 340—259 |
| 2,400,489 | 5/1946 | Dana | 235—98.5 |
| 2,790,110 | 4/1957 | Applegate | 235—92 |
| 2,946,992 | 7/1960 | Broido | 340—259 |

FOREIGN PATENTS 808,274  2/1959  Great Britain.

OTHER REFERENCES

Publication, Electronics; pp. 81–83, July 1949.

NEIL C. READ, *Primary Examiner.*

BENNETT G. MILLER, ROBERT H. ROSE, *Examiners.*